United States Patent [19]

Nakada et al.

[11] Patent Number: 4,552,504
[45] Date of Patent: Nov. 12, 1985

[54] INDUSTRIAL ROBOT

[75] Inventors: Akiyoshi Nakada, Suita; Toshitugu Inoue, Kyoto; Haruo Tada, Kobe; Kiyoshi Shinki, Neyagawa; Kuninori Takezawa, Ikeda; Makoto Doi, Sakai, all of Japan

[73] Assignee: Matsushita Electric Industrial Co., Ltd., Kadoma, Japan

[21] Appl. No.: 579,362

[22] PCT Filed: May 31, 1983

[86] PCT No.: PCT/JP83/00175
§ 371 Date: Jan. 31, 1984
§ 102(e) Date: Jan. 31, 1984

[30] Foreign Application Priority Data

May 31, 1982 [JP] Japan ................... 57-93614

[51] Int. Cl.⁴ ............................................. F16H 33/00
[52] U.S. Cl. ...................................... 414/735; 74/640; 901/15
[58] Field of Search ..................... 414/735; 901/15, 23, 901/24, 26, 28; 74/640

[56] References Cited

U.S. PATENT DOCUMENTS 4,044,274  8/1977  Ohm .................................. 74/640 X
4,090,766  6/1978  Pardo et al. ........................... 74/640
4,399,718  8/1983  Zimmer ............................. 901/25 X Primary Examiner—William E. Wayner
Attorney, Agent, or Firm—Wenderoth, Lind & Ponack

[57] ABSTRACT

An industrial robot is constituted by a plurality of series connected arm units each composed of a driving unit from among a plurality of driving units having different driving powers and different driving speeds, a joint unit from among a plurality of joint units having different driving speeds and power transmitting capacities, and an arm from among a plurality of arms having different sizes and load capacities. The joint units, driving units and arms each have connecting surfaces thereon having positioning parts and setting-fixing parts in a predetermined pattern for enabling the joint units, driving units and arms to be detachably connected to other joint units, driving units and arms at corresponding connecting surfaces to form arm units with the desired joint units, driving units and arms. The joint units each have a stationary frame and a follower frame rotatably connected to each other and driving power transmitting mechanism connected between said frames and including reduction gears. The driving units each have a motor and an output member fixed to the motor shaft which, when a driving unit is connected with a joint unit, is engaged with power transmitting mechanism.

4 Claims, 7 Drawing Figures

INDUSTRIAL ROBOT

DESCRIPTION

1. Technical Field

The present invention primarily relates to a multi-joint robot for industrial use applicable to operations of assembling and adjustment of machine parts.

2. Background Art

The conventional type multi-joint robot has been subject to limitation as to the spatial range of operation since the arms thereof are driven by actuators disposed near the base through rings or the like, and has difficulties in operation in a narrow space because of actuators and other elements extending into the space outside the joints.

A joint part or a joint part connected to an arm part has been a solid structure and incapable of meeting the requirements of wider range of operation. Also, when required to carry a heavier load, the robot of this type has had the a problem of insufficient output and of being incapable of easily satisfying the requirement for increasing the work transfer speed. As described above, the conventional type multi-joint industrial robot has had drawbacks such as incapability of corresponding to variation in operation space, limitations on the weight of the work, and work transfer speed.

As a device for eliminating the above-described drawbacks, there is, for example, a robot constructed of the so-called building block system composed of standarized units each having interchangeability with the others and combined for use like building blocks.

This type of robot includes a plurality of standardized units each comprising a base, components movable relatively to the base, driving means for driving these components, and sensing means for sensing relative positions of the base and the movable components and differing from the others in driving power, spatial operation range, etc., and suitably combined with the other according to the use thereof, thereby being characterized by adaptability to varieties of operation.

However, such structure as above permits no more than selective combination of units with the aid of standarized shapes and sizes of parts of the base and movable components, and each unit lacks versatility and adaptability to variation in operation space, moving speed, and driving power. Therefore, when, for example, driving power is desired to be varied while the operation space is kept the same, the unit itself must be replaced by another one, thereby preventing performance helpful to cost saving or operation.

DISCLOSURE OF THE INVENTION

An object of the present invention is to provide a structure particularly suitable for the joint-type robot and adaptable to a variety of operational conditions including operation space, loading capacity, work transfer speed, and so on, to overcome the problems as described above and to provide a structural and mounting arrangement of joint parts, arms, and driving means, wherein an actuator incorporated into the arm and reduction gears disposed in the joint part make it possible to provide slim arms and small-sized joint parts, greatly contributing to automation of assemblage and adjustment operation, which type of apparatus is in strong demand these days.

The present invention is characterized by a structure to achieve the above object which is provided with a base unit turntable around a vertical axis and a plurality of arm units to be connected to each other in series and disposed on the turning base, each arm unit comprising driving units of a plurality of kinds corresponding to the variety of driving power transmitting capacity, and arms incorporating driving units thereinto, capable of being connected to joint units at both ends thereof, and of a plurality of kinds for corresponding to the variety of operation space and loading capacity, which are all selectively combined and connected to each other. Further, the present invention is characterized in that the driving unit is detachably connected to the joint unit which is also detachably connected to the arm through a key. Still further, the present invention is characterized by a driving unit comprising a motor provided with a driving power transmitting member on the output shaft thereof, a flange to which an encoder, potentiometer, and brake are integrally secured, and bearing parts arranged within the flange so as to rotatably retain the output shaft of the motor.

Furthermore, the present invention is characterized in that a joint unit is composed of two joint members approximately U-shaped and rotatably connected to each other, one set of bearing disposed at each of two connecting parts of the abovesaid members, reduction gears provided on one or both of the abovesaid connecting parts, and adjusting members which are capable of adjusting the gap between connecting parts and variable in the direction of the axis of the joint member, disposed on two connecting parts of one joint member.

MOST PREFERRED EMBODIMENT OF THE INVENTION

Figure 1A:
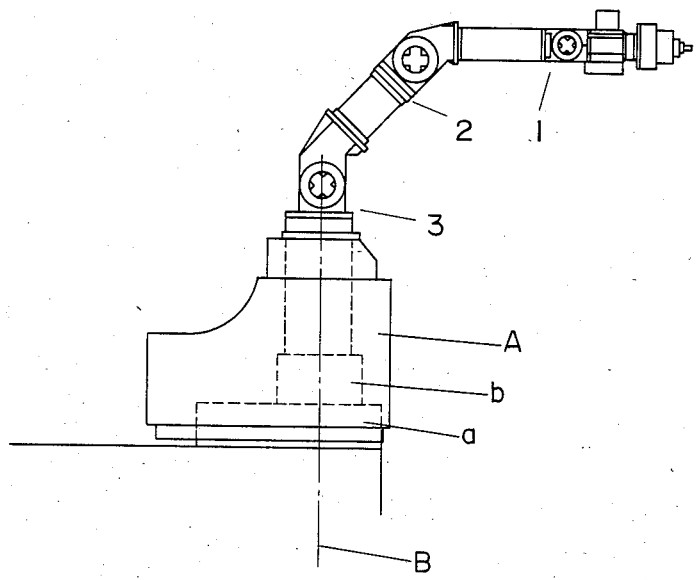
FIGS. 1a and 1b are side elevation and plan views, respectively, of an industrial robot according to one embodiment of the present invention.
Figure 1B:
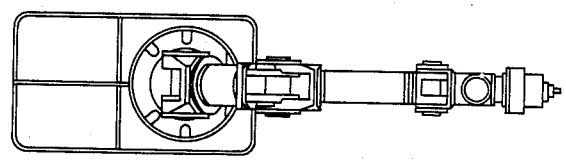
Figure 2:
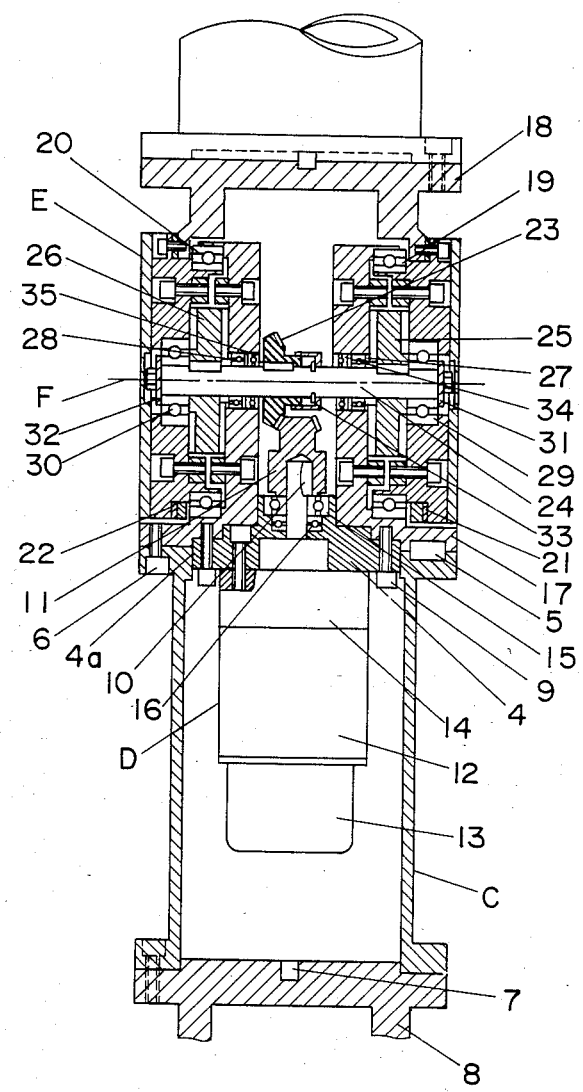
FIG. 2 is a sectional view of the arm unit of the robot shown in FIG. 1.

As shown in FIGS. 1a and 1b and FIG. 2, and industrial robot according to the present invention comprises a plurality of arm units 1, 2, and 3 connected to each other in series and disposed on the base unit A. The base unit A comprises a turning table b disposed on the base a and driven around a vertical axis B through the motor and reduction gears (both not illustrated), arm units 1, 2, and 3 being each composed of an arm C, driving unit D, and joint unit E. The arm C is hollow and, at one end, is detachably connected to the flange 17 on the stationary frame 17a joint unit E by bolts 6 through the flange 4 and a key 5 and is detachably connected to another joint unit 8 at the other end through the key 7. The driving unit D is disposed in the hollow interior of arm C and detachably connected into the joint unit E with bolts 9 at the outer periphery of the flange 4.

Figure 3A:
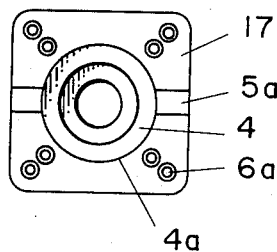
FIGS. 3a–3c are schematic views showing how a selective combination of arms and joint units can be made.
Figure 3B:
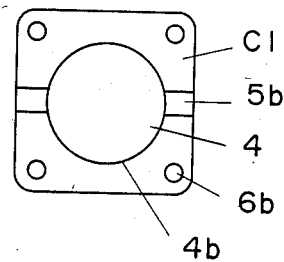
Figure 3C:
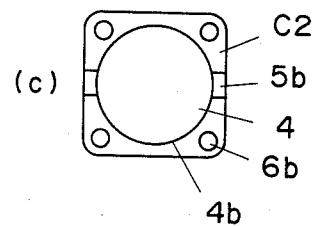

FIG. 3 shows an example of selective combination of an arm $C_1$ or $C_2$ and the joint unit E. FIG. 3a is a plan of the flange 17 of the stationary frame of the joint unit E, in which keyways 5a, a recess 4a to receive a flange 4 of a drive unit $C_1$ or $C_2$, and threaded holes 6a for bolts are provided in a plurality of patterns in accordance with a predetermined arrangement. FIGS. 3b and 3c are plan views of the end face of arms $C_1$ and $C_2$, respectively, in which keyways 5b, an aperture 4b to receive a flange 4, and holes 6b for bolts 6 are formed in one of the patterns in accordance with the predetermined arrangement. Before the arc $C_1$ or $C_2$ is connected to the joint E by bolts 6 inserted through holes 6a or 6b and fastened, keys 5 are inserted into keyways 5a and 5b and the flange 4 on a driving unit is fitted into recess 4a and connected to joint unit E. As already apparent, so long as recess 4a, flange 4b, keyways 5a and 5b as well as bolt holes 6a and 6b are formed in accordance with a predetermined arrangment, either the arm $C_1$ or the arm $C_2$ can be connected to joint unit E.

Similarly, the joint unit E and the driving unit D are formed so as to be selectively combinable.

Incidentally, a key is described as being used for a positioning part; however, a pin may be used instead. After all and as a matter of course, the purpose is fulfilled by fixing the position of the arm relatively to the joint unit as predetermined as well as of the joint unit relatively to the driving unit.

The driving unit is constituted by the flange 4 having integrally secured thereto a motor 12 having a bevel gear 11 fixed to the output shaft thereof through the key 10, a position sensing unit 13 into which an encoder and potentiometer are integrally incorporated, and a brake 14 which operates when the power supply for the motor is cut, bearings 15 and 16 incorporated into the flange 4 supporting against a bending force and an axially acting force produced at the bevel gear. On the joint unit E, an approximately U-shaped stationary frame 17a constituting a joint member has a follower frame 18 supported thereon by bearings 19 and 20 for rotation around the axis F of a rotating shaft 24, the gaps between bearings and adjoining members being adjusted by collars 21 and 22 disposed in a first step in flange 17 and the power transmitted from the driving unit D is further transmitted to the shaft 24 through bevel gears 11 and 23, whereby the stationary and the follower frames 17 and 18, respectively, perform relative movement for bending the joint unit with high precision through reduction gears 25 and 26. The main shaft 24 is supported by bearings 27, 28, 29, and 30 in the stationary and the follower frames 17 and 18, respectively, and gaps between these bearings and adjoining members can be adjusted by fastening nuts 31 and 32 disposed at both ends of the main shaft for preventing backlash in the axial direction. Power transmission between the driving unit D and the joint unit E can be made smooth and free from backlash by adjusting and then fixing gaps between teeth of bevel gears 11 and 23 at a certain width. The force acting in the axial direction in the main shaft 24 produced by the abovesaid bevel gear 23 or reduction gears 25 and 26 is supported by thrust bearings 34 and 35 provided on the main shaft 24.

Figure 4:
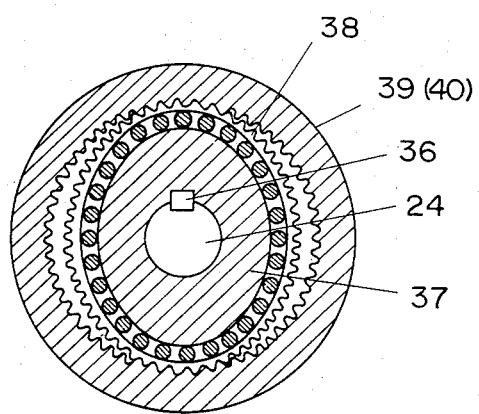
FIG. 4 is a sectional view of reduction gears.

As shown in FIG. 4, the reduction gears 25 and 26 each comprise an elliptical driving wheel 37 fixed to the main shaft 24 through the key 36, an externally-toothed elastically deformable gear 38, an internally-toothed wheel 39 meshing with the externally-toothed gear 38 at two points and fixedly secured to a frame 17a and an internally-toothed wheel 40 fixed frame 18, and the internally-toothed wheel 39 having the same number of teeth as the externally-toothed wheel 38 whereas the internally-toothed wheel 40 has a different number of teeth from those of the other two toothed wheels.

Other joint units have the same structure as described above and can be assembled into a multi-joint robot.

Driving units D, joint units E, and arms C, each having of the structure as described above, are prepared in a plurality of forms according to the driving power and speed, driving power transmitting capacity, and operation space and loading capacity, respectively, and these units can selectively combined for forming an arm unit and a plurality of such arms units are connected to each other in series to be formed into a robot.

When the arm length is increased, driving power must be increased due to an increased moment; however, the length need not be increased in some cases according to the manner of operation even when, for example, the arm is elongated for extending the operation space. In the latter case, replacement of only the arm with a different one may suffice though the joint unit and the driving unit remain unchanged. The arm can be replaced without any influence on the connection of the joint unit to the driving unit, and connection of the driving unit with the joint unit establishes connection for power transmission, too, the connecting operation as well as the detaching operation being easy.

In this embodiment, the rotating axis of the joint is horizontal; however, it may be vertical, that is, it is not limited.

Now, the operation of a robot will be described.

When the motor rotates in the right or reverse direction, the driving wheel 37 rotates through bevel wheels 11 and 23 and the main shaft 24. With the rotation of the driving wheel 37, the externally-toothed wheel 38 is deformed and meshing points thereof with the internally-toothed wheels 39 and 40 move but the position of the externally-toothed wheel 38 relative to the internally-toothed wheel 39 is not varied because of the same number of teeth of both wheels. However, the position of the externally-toothed wheel 38 relative to the internally-toothed wheel 40 is changed due to the different number of teeth between the two wheels and the wheel turns the follower frame 18.

Since the motor 24 is provided with a position sensing unit 13, arm units 1, 2, and 3 can move to the desired positions.

INDUSTRIAL APPLICABILITY

As described above, according to the present invention, a robot is easily constructed by forming arm units, each being to be composed of joint units, driving units, and arms selectively combined corresponding to the kinds of operation space, weight of the work, and work transfer speed, and by connecting these units to each other in series. Thus, a multi-joint robot operable with high precision is provided and increased versatility in the use is ensured.

In addition, since the arm is hollow and adapted to contain actuators and the like therewithin, the mechanism has no projecting parts and, therefore, is slim, and the provision of reduction gears for each joint permits size reduction in all parts, thereby making it possible to provide a multi-joint robot highly effective for operation in a narrow space.

What is claimed is:

1. An industrial robot comprising:
   a plurality of arm units each composed of a driving unit from among a plurality of driving units having different driving powers and different driving speeds, a joint unit from among a plurality of joint units having different driving speeds and power transmitting capacities, and an arm from among a plurality of arms having different sizes and load capacities, said arm units being connected to each other in series, said joint units, driving units and arms each having connecting surfaces thereon having positioning parts and setting-fixing parts in a predetermined pattern for enabling the joint units, driving units and arms to be detachably connected to other joint units, driving units and arms at corresponding connecting surfaces to form arm units with the desired joint units, driving units and arms;

said joint units each having a stationary frame and a follower frame rotatably connected to each other for rotation around an axis of rotation and being connected at two positions along said axis of rotation and having a driving power transmitting mechanism connected between said frames and including reduction gears at at least one of said two positions;

said driving units each having a motor, a position sensing unit fixed to said motor, and a flange on which said motor is mounted and having bearings rotatably supporting the shaft of said motor and an output member fixed to the motor shaft, said motor shaft, when a driving unit is connected with a joint unit, intersecting said axis of rotation of said joint unit and said power transmission mechanism having means engaged with the output member on the motor shaft of the connected driving unit, whereby said output member and said power transmission mechanism are connected to each other in an arm unit so as to be capable of power transmission from the motor of the driving unit to the power transmission mechanism of a joint unit.

2. An industrial robot as claimed in claim 1 wherein each arm is hollow and in the assembled arm unit a driving unit is contained in an arm.

3. An industrial robot as claimed in claim 1 wherein said joint units and driving units have connecting surfaces for enabling them to be connected to each other, and said joint units and said arms having connecting surfaces for enabling them to be connected to each other.

4. An industrial robot as claimed in claim 3 in which each arm is hollow and in the assembled arm unit, a driving unit is contained in an arm, the corresponding connecting surfaces of the joint unit and arm being outside of, relative to the interior of the hollow arm, the corresponding connecting surfaces of the joint unit and the driving unit, whereby the arm can be attached to and detached from the joint unit, whereby the arm can be attached to and detached from the joint unit independently of the attachment and detachment of the driving unit from the joint unit.

* * * * *